United States Patent
Wu et al.

(10) Patent No.: US 8,289,825 B2
(45) Date of Patent: Oct. 16, 2012

(54) OPTICAL DISK DRIVES AND METHOD FOR CONTROLLING TRACK-SEEKING FOR OPTICAL DISK DRIVES

(75) Inventors: Ming-Tsang Wu, Taipei County (TW); Yu-Chun Lin, Hsin-Chu (TW); Ying-Feng Huang, Chia-Yi Hsien (TW); Hua-Ting Chi, Shulin (TW)

(73) Assignee: Mediatek Inc., Hsin-Chu (TW)

( * ) Notice: Subject to any disclaimer, the term of this patent is extended or adjusted under 35 U.S.C. 154(b) by 320 days.

(21) Appl. No.: 12/115,601

(22) Filed: May 6, 2008

(65) Prior Publication Data
US 2009/0279395 A1 Nov. 12, 2009

(51) Int. Cl.
*G11B 7/00* (2006.01)
(52) U.S. Cl. ........... 369/44.15; 369/44.21; 369/44.22; 369/44.28; 369/44.29
(58) Field of Classification Search .......... 369/30.17, 369/44.11, 44.13, 112.25, 44.29, 30.03, 44.23, 369/44.12, 44.35, 44.15, 44.28, 44.21
See application file for complete search history.

(56) References Cited

U.S. PATENT DOCUMENTS

| | | | | |
|---|---|---|---|---|
| 6,282,158 | B1 * | 8/2001 | Kuroiwa | 369/44.41 |
| 6,597,644 | B1 * | 7/2003 | Kang | 369/44.35 |
| 6,628,576 | B1 * | 9/2003 | Watanabe et al. | 369/30.17 |
| 2002/0021632 | A1 * | 2/2002 | Park | 369/44.28 |
| 2002/0126589 | A1 * | 9/2002 | Osada et al. | 369/44.23 |
| 2004/0071054 | A1 * | 4/2004 | Watanabe et al. | 369/44.29 |
| 2006/0109758 | A1 * | 5/2006 | Uchida et al. | 369/44.29 |
| 2006/0262670 | A1 * | 11/2006 | Yamashita | 369/30.03 |
| 2008/0101169 | A1 * | 5/2008 | Suzuki et al. | 369/44.13 |
| 2008/0259776 | A1 * | 10/2008 | Takeda | 369/112.25 |
| 2008/0267019 | A1 * | 10/2008 | Kimura et al. | 369/44.12 |
| 2009/0103403 | A1 * | 4/2009 | Kurosawa | 369/44.29 |

FOREIGN PATENT DOCUMENTS

| | | |
|---|---|---|
| TW | 470949 | 1/2002 |
| TW | 200737164 | 10/2007 |

OTHER PUBLICATIONS

English language translation of abstract of TW 470949 (published Jan. 1, 2002).
English language translation of abstract of TW 200737164 (published Oct. 1, 2007).

* cited by examiner

*Primary Examiner* — Thuy Pardo
(74) *Attorney, Agent, or Firm* — Thomas|Kayden (57) ABSTRACT

The invention provides an optical disk drive. The optical disk drive comprises a pickup head, a seek control device, a lens vision characteristic decoder, and an anti lens shift device. The pickup head comprises a sled and a lens for projecting a beam on a disk. The seek control device moves the sled, and shifts the lens with a shift distance relative to an origin at a center of the sled. The equalizer derives a servo signal from a reflection of the beam. The lens vision characteristic decoder obtains a vision characteristic of the lens according to the servo signal and determines a track-on direction according to the vision characteristic. The anti lens shift device triggers the seek control device to perform a track-on process according to the track-on direction.

24 Claims, 8 Drawing Sheets

OPTICAL DISK DRIVES AND METHOD FOR CONTROLLING TRACK-SEEKING FOR OPTICAL DISK DRIVES

BACKGROUND OF THE INVENTION

1. Field of the Invention

The invention relates to optical disk drives and method, and more particularly to optical disk drives and method for controlling track seeking for optical disk drives.

2. Description of the Related Art

Data is recorded on different positions of an optical disk. When an optical disk drive wants to read specific data from an optical disk, the optical disk drive must project a laserbeam of a pickup head on a target position corresponding to an address of the specific data in advance, and then derive data from reflection of the laserbeam. The position of a spot of the laserbeam projected on the optical disk surface is determined by a position of the pickup head and a position of an objective lens in the pickup head. The optical disk drive therefore must adjust the positions of both the objective lens and the pickup head to aim at the spot of the laserbeam at the target position of the specific data.

An optical disk drive performs a track-seeking procedure to move a spot of a laserbeam emitted by a pickup head from an original position to a target position on a disk surface. A position of a pickup head is controlled by a sled, and a position of an objective lens in the pickup head is controlled by a tracking coil. The track-seeking procedure therefore comprises adjusting the position of the pickup head by the sled and adjusting the position of the objective lens by the tracking coil.

Figure 1:
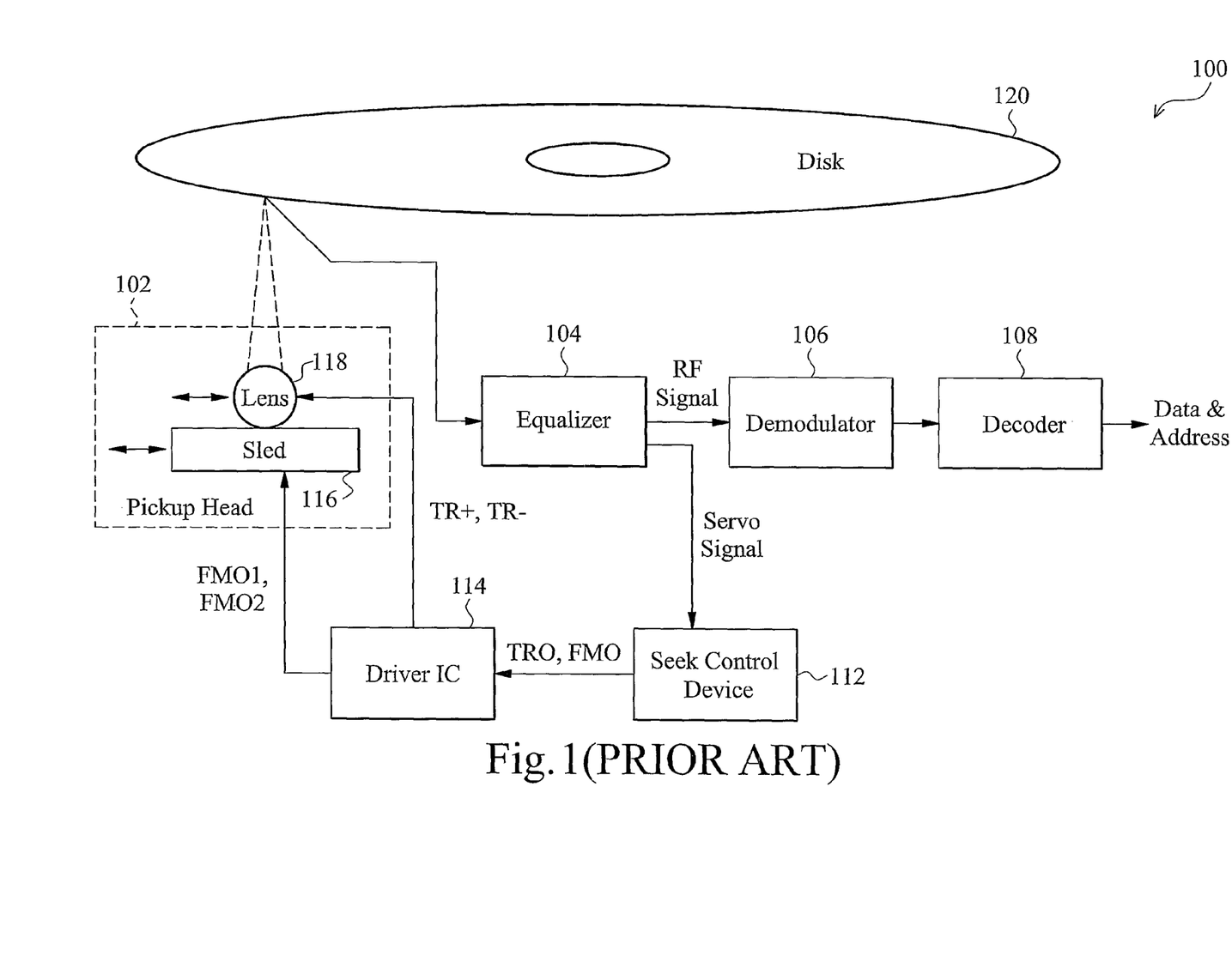
FIG. 1 is a block diagram of a conventional optical disk drive.

Referring to FIG. 1, a block diagram of a conventional optical disk drive 100 is shown. The optical disk drive 100 comprises a pickup head 102, an equalizer 104, a demodulator 106, a decoder 108, a seek control device 112, and a driver IC 114. The pickup head 102 comprises an objective lens 118 projecting a laser beam on the surface of a disk 120 and a sled 116 adjusting the position of the pickup head 102. When the optical disk drive 100 requires reading data stored on a specific portion of the disk 120, the seek control device 112 first generates a tracking control output (TRO) signal for controlling a tracking coil in the pickup head 102 and a feed motor output (FMO) signal for controlling a stepping motor (not shown). The driver IC 114 then derives FMO1 and FMO2 signals from the FMO signal, and the stepping motor adjusts a position of the sled 116 according to the FMO1 and FMO2 signals. Similarly, the driver IC 114 derives TR+ and TR− signals from the TRO signal for the tracking coil to adjust a position of the objective lens 118 on the sled 116.

After both the positions of the sled 116 and the objective lens 118 are shifted, the laserbeam projected by the lens 118 is aimed at the specific portion of the disk 120 storing the specific data and reflection of the laserbeam is generated. The equalizer 104 then derives a radio frequency (RF) signal from the reflection of the laserbeam. The demodulator 106 and the decoder 108 then respectively demodulate and decode the RF signal to obtain the specific data and address thereof. The equalizer 104 also derives servo signals such as a tracking error (TE) signal and a focusing error (FE) signal from the reflection. The seek control device 112 can therefore generates the TRO signal and the FMO signal according to the servo signals to control the position of the lens 118 and the sled 116.

Figure 2:
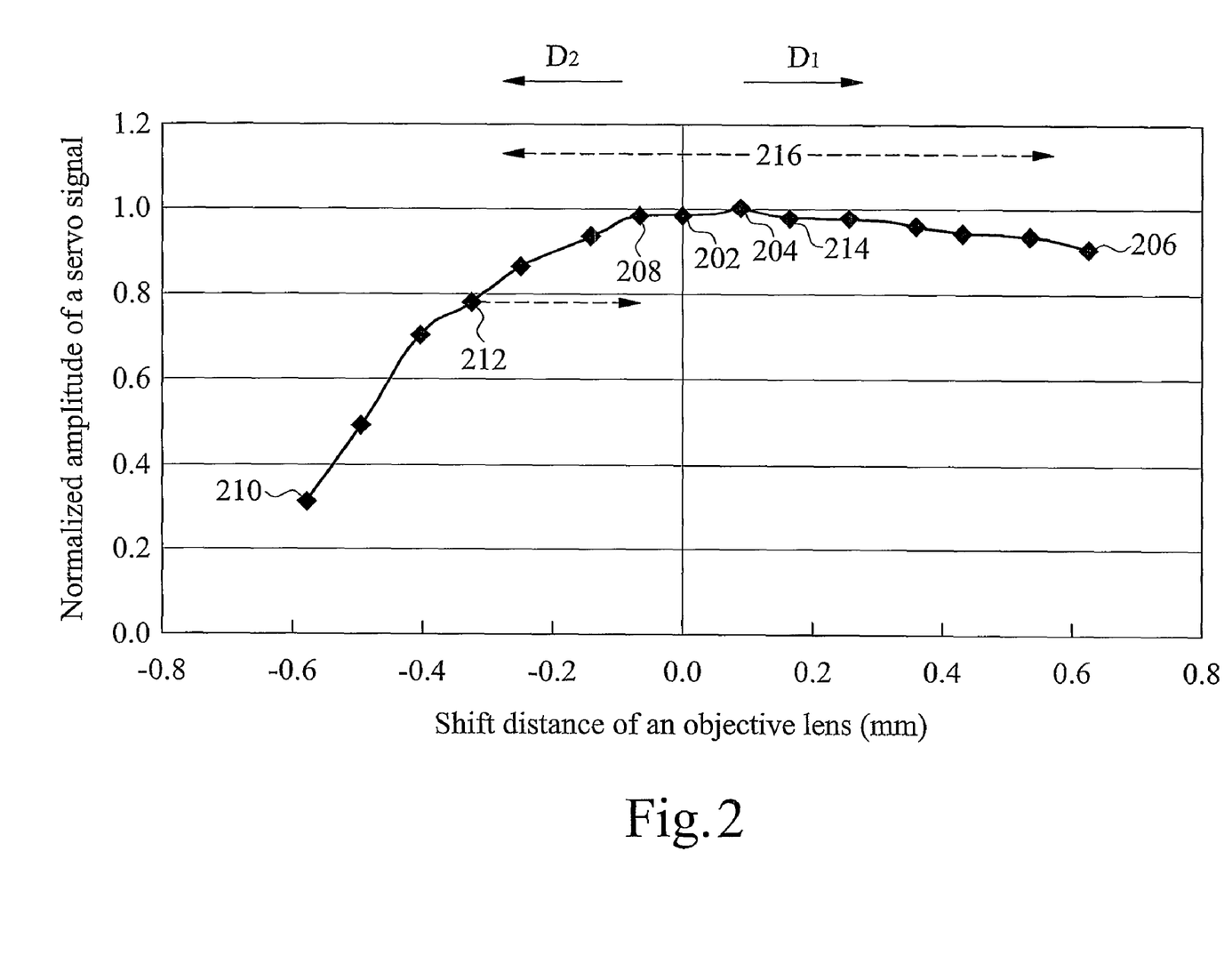
FIG. 2 shows an embodiment of a relation between an amplitude of a servo signal and different shift distances of an objective lens.

The position of lens 118 in the pickup head 102 is defined with a shift distance counted from an origin at a middle point of the sled 116. When the lens 118 is shifted with different shift distances in the pickup head 102, the strength of the reflection from the disk 120 also differs, affecting quality of servo signals derived from the reflection. Referring to FIG. 2, shows an example of a relation between amplitude of a servo signal and different shift distances of the objective lens 118, which is also known as the vision characteristic of the pickup head 102. When the objective lens 118 is located at the origin, the shift distance is 0, and the largest amplitude of servo signal is around the origin point. When the shift distance is positive and increases, the objective lens 118 is shifted towards one side of the sled 116, and the amplitude of the servo signal slightly decreases. When the shift distance is negative and decreases, the objective lens 118 is shifted towards the other side of the sled 116, and the amplitude of the servo signal significantly decreases. The objective lens 118 should be prevented from being moved to positions with large negative shift distances, since the objective lens 118 with a positive shift distance generates a servo signal with larger amplitude. For example, if the objective lens 118 is shifted to a position with a shift distance of −0.5 mm, the amplitude of the servo signal is lowered to almost a half of the amplitude of the servo signal generated by a lens at the origin, and the low amplitude of the servo signal may cause errors in operation of the optical disk drive.

Figure 3:
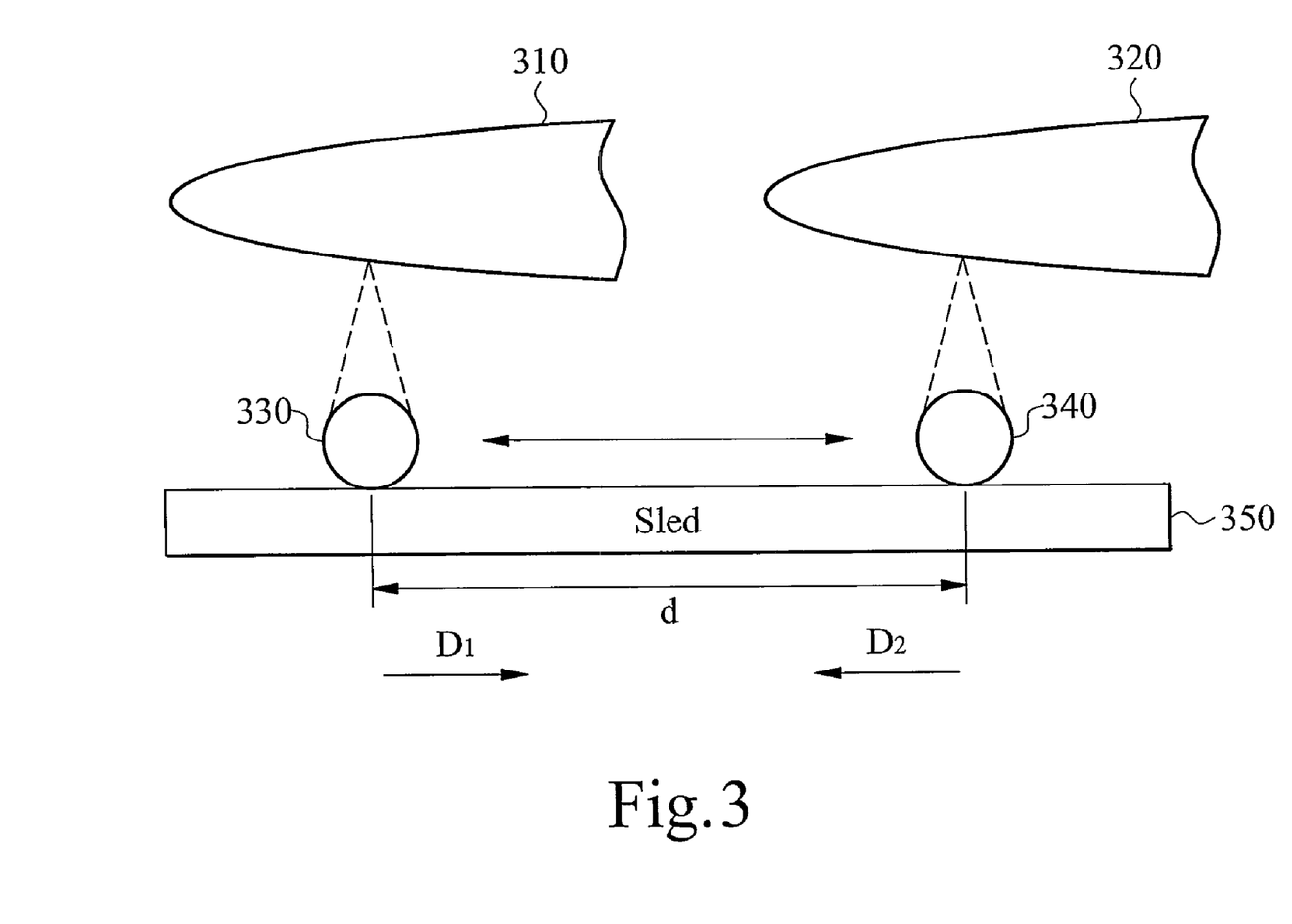
FIG. 3 is a schematic diagram of oscillation of a lens in correspondence with oscillation of a disk.

The conventional optical disk drive 100 therefore may erroneously operate according to servo signals with low amplitudes due to the objective lens 118 with a negative shift distance. In addition, an eccentric disk 120 further deteriorates the problem. Referring to FIG. 3, a schematic diagram of oscillation of a lens in correspondence with oscillation of a disk is shown. If the optical disk 120 is an eccentric disk, a track of the eccentric disk 120 swings back and forth when the disk 120 is rotated, as shown by the disks 310 and 320. The objective lens 118 must therefore oscillate back and forth to fix a spot of the laserbeam on the track, as shown by the lens 330 and 340. When a bias distance of an eccentric track is 0.28 µm, the oscillation distance of the track is 0.56 µm, and the objective lens 118 must be accordingly shifted with an oscillation distance d of 0.56 µm. If the objective lens 118 is originally located at a position with a negative shift distance, the oscillation due to eccentric disk may shift the objective lens 118 to a position with a large negative shift distance, and the amplitude of the servo signal generated therefrom will greatly decrease as shown in FIG. 2. An optical disk drive therefore requires a mechanism to prevent the lens from an extreme shift distance when the optical disk drive adjusts the position of the lens for track-seeking.

BRIEF SUMMARY OF THE INVENTION

The invention provides an optical disk drive. In one embodiment, the optical disk drive comprises a pickup head, a seek control device, a lens vision characteristic decoder, and an anti lens shift device. The pickup head comprises a sled and a lens for projecting a beam on a disk. The seek control device moves the sled, and shifts the lens with a shift distance relative to an origin at a center of the sled. The equalizer derives a servo signal from a reflection of the beam. The lens vision characteristic decoder obtains a vision characteristic of the lens according to the servo signal and determines a track-on direction according to the vision characteristic. The anti lens shift device triggers the seek control device to perform a track-on process according to the track-on direction.

The invention provides another embodiment of an optical disk drive. The optical disk drive comprises a pickup head, a seek control device, an equalizer, and an anti lens shift device. The pickup head comprises a sled and a lens for projecting a beam on a disk. The seek control device moves the sled, and shifts the lens with a shift distance relative to an origin at a center of the sled. The equalizer derives a servo signal from reflection of the beam. The anti lens shift device determines a shift direction of the lens relative to the sled according to the servo signal after a track-on process is performed, and generates a force to move the sled according to the shift direction, thus allowing the lens to be located at a predetermined position after the track-on process is completed.

The invention further provides a method for controlling track-seeking for an optical disk drive. In one embodiment, a pickup head of the optical disk drive comprises a sled and a lens for projecting a beam on a disk, and a seek control device of the optical disk drive is capable of moving the sled and shifting the lens with a shift distance relative to an origin at a center of the sled. First, a servo signal is derived from reflection of the beam. A vision characteristic of the lens is then obtained according to the servo signal. A track-on direction is then determined according to the vision characteristic. Finally, the seek control device is triggered to perform a track-on process according to the track-on direction.

Further, another method for controlling track-seeking for an optical disk drive is provided. In one embodiment, a pickup head of the optical disk drive comprises a sled and a lens for projecting a beam on a disk, and a seek control device of the optical disk drive is capable of moving the sled to move the pickup head and shifting the lens with a shift distance relative to an origin at a center of the sled. First, a servo signal is derived from reflection of the beam. A shift direction of the lens relative to the sled is determined according to the servo signal after a track-on process is performed. A force is then generated to move the sled according to the shift direction, thus allowing the lens to be located at a predetermined position after the track-on process is completed.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
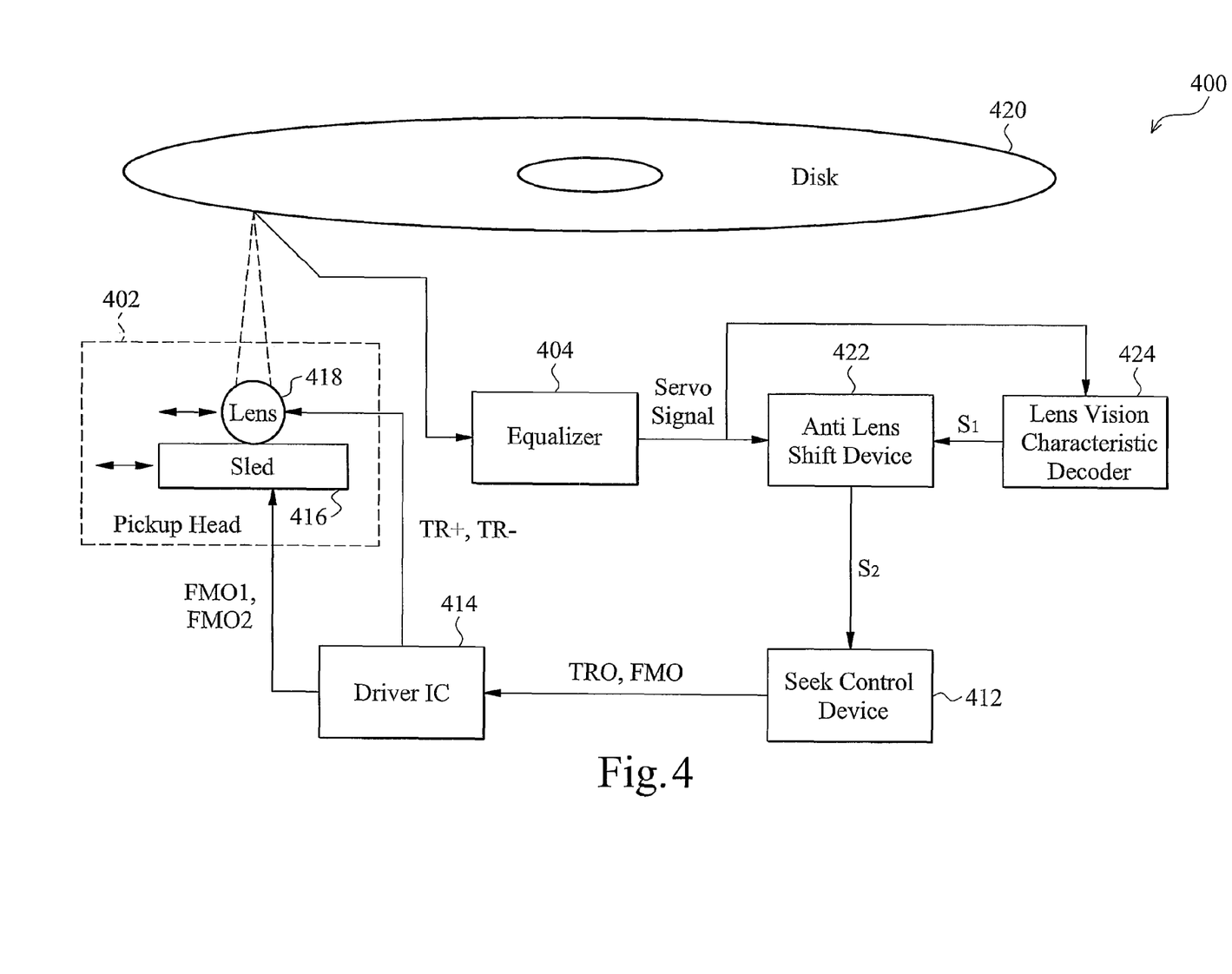
FIG. 4 is a block diagram of an optical disk drive according to an embodiment of the invention.

Referring to FIG. 4, a block diagram of an optical disk drive 400 according to an embodiment of the invention is shown. The optical disk drive 400 comprises a pickup head 402, an equalizer 404, an anti lens shift device 422, a lens vision characteristic decoder 424, a seek control device 412, and a driver IC 414. The pickup head 402 comprises an objective lens 418 and a sled 416. The objective lens 418 projects a laserbeam on data layer of the disk 420. The sled 416 adjusts the position of the pickup head 420. When the optical disk drive 400 performs track-seeking operation to move a spot of the laserbeam from one portion to another portion of the data layer of the disk 420, the positions of both the lens 418 and the sled 416 must be adjusted. The seek control device 412 generates a tracking control output (TRO) signal for adjusting the position of the lens 418 and a feed motor output (FMO) signal for adjusting the position of the sled 416. The driver IC 414 converts the TRO signal to a TR+ signal and a TR− signal for controlling a tracking coil to adjust the position of the lens 418 in the pickup head 402. The driver IC 414 also converts the FMO signal to an FMO1 signal and an FMO2 signal for controlling a sled motor to adjust the position of the sled 416.

After both the positions of the sled 416 and the lens 418 are adjusted, the spot of the laserbeam is moved to a target portion of the disk data layer 420 storing specific data, and track-seeking operation is completed. The equalizer 404 derives a servo signal from reflection of the laserbeam from the disk data layer 420. The optical disk drive 400 comprises two distinctive modules: the anti lens shift device 422; and the lens vision characteristic decoder 424. As the vision characteristic of the lens 418, shown in FIG. 2, when the lens 418 is located at positions with different shift distances from an origin at the middle of the sled 416, the reflection of the laserbeam projected by the lens 418 has different amplitudes, and the servo signal derived from the reflection has different amplitudes. The lens vision characteristic decoder 424 therefore checks the amplitudes of the servo signals corresponding to different shift distances of the lens 418 to obtain the vision characteristic of the pickup head 402. The lens vision characteristic decoder 424 then determines a track-on direction $S_1$ according to the detected vision characteristic of the pickup head 402 for the anti lens shift device 422 to shift the lens before track-seeking operation is performed. Since the lens 418 is shifted in the proper shift direction $S_1$, the amplitude of the servo signal does not rapidly decrease, securing the optical disk drive 400 from erroneous operation according to the servo signal.

Figure 5:
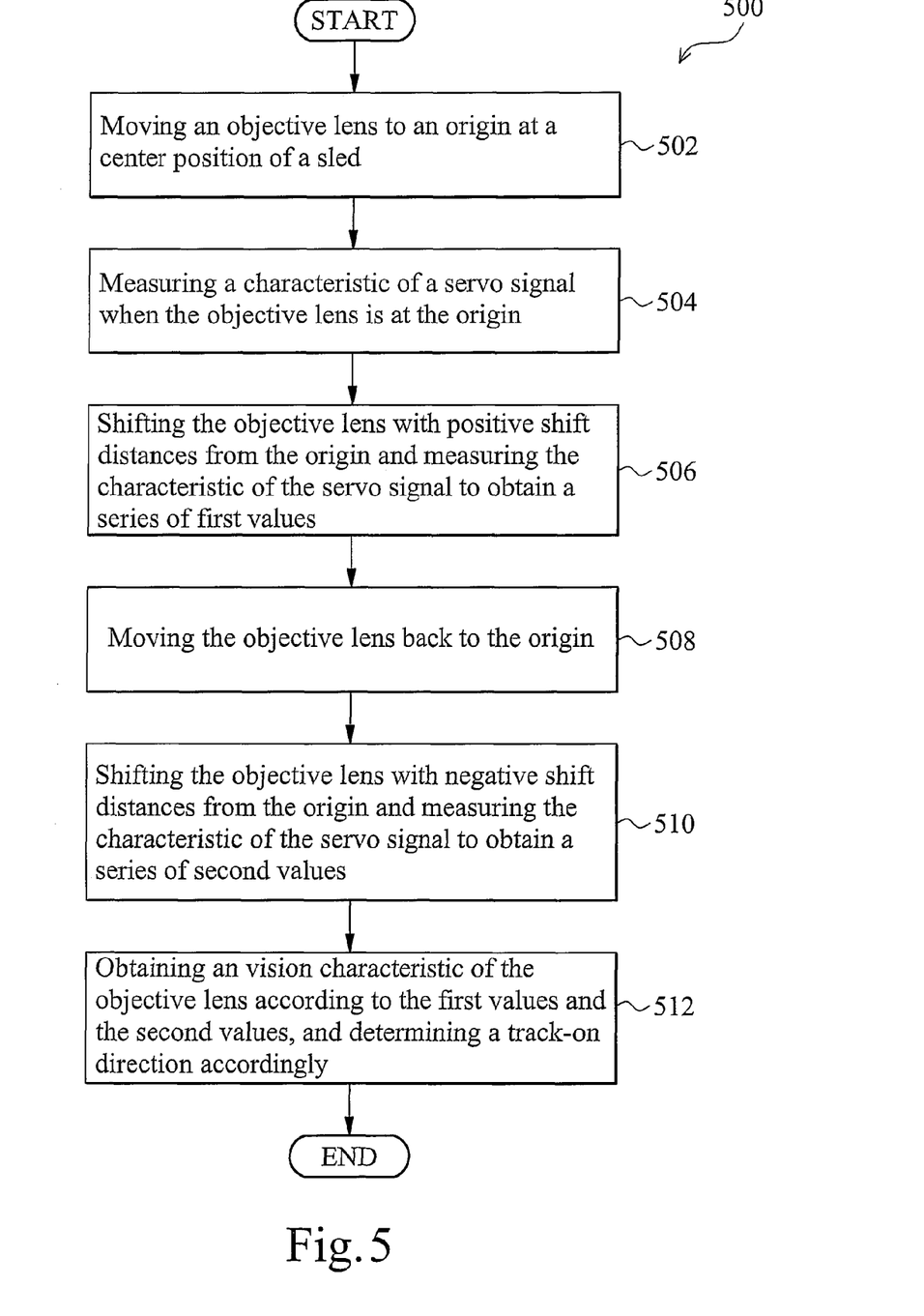
FIG. 5 is a flowchart of a method for obtaining an vision characteristic of the objective lens according to the invention.

FIG. 5 shows a flowchart of a method 500 of detecting the vision characteristic of the pickup head 402 for determining a proper shift direction accordingly for the lens 418 according to an embodiment of the invention. With referring to FIGS. 2 and 5, the operation of the method 500 is described as follows. The seek control device 412 first generates a TRO signal to move the lens 418 to an origin at a center of the sled 416 (step 502). The lens 418 then projects a laserbeam to the data layer of the disk 420, and the equalizer 404 derives a servo signal from reflection of the laserbeam. In one embodiment, the servo signal is a tracking error (TE) signal, a radio frequency (RF) signal, a radio frequency ripple (RFRP) signal, a differential push-pull (DPP) signal, a main beam push pull (MPP) TE signal, or a differential phase detection (DPD) TE signal. The lens vision characteristic decoder 424 then measures a characteristic of the servo signal to obtain a value 202 shown in FIG. 2 (step 504). In one embodiment, the characteristic is an amplitude of the servo signal or a signal-to-noise ratio (SNR) of the servo signal.

The seek control device 412 then generates the TRO signal to gradually move the lens 418 towards the direction $D_1$ shown in FIG. 2 from the origin, and the lens 418 is therefore sequentially shifted with different positive shift distances (step 506). The lens vision characteristic decoder 424 then respectively measures the characteristic of the servo signal corresponding to the positive shift distances, and a series of first values 204~206 shown in FIG. 2 are obtained. The seek control device 412 then moves the lens 418 back to the origin (step 508), and then generates the TRO signal to gradually move the lens towards the direction $D_2$ shown in FIG. 2 (step 510). The lens 418 is therefore sequentially shifted with different negative shift distances. The lens vision characteristic decoder 424 then respectively measures the characteristic of the servo signal corresponding to the negative shift distances, and a series of second values 208~210 shown in FIG. 2 are obtained. By comparing the first values 204~206 corresponding to positive shift distances with the second values 208~210 corresponding to negative shift distances, the lens vision characteristic decoder 424 obtains the vision characteristic of the lens 418 as shown in FIG. 2 according to the first values and the second values and determines a direction $S_1$ for the lens 418 according to the vision characteristic of the lens 418 (step 512). It is noted that designers may adjust the number of first values and second values according to design necessity; for example, only one first value and one second value are obtained for obtaining the vision characteristic of the lens 418.

Figure 6:
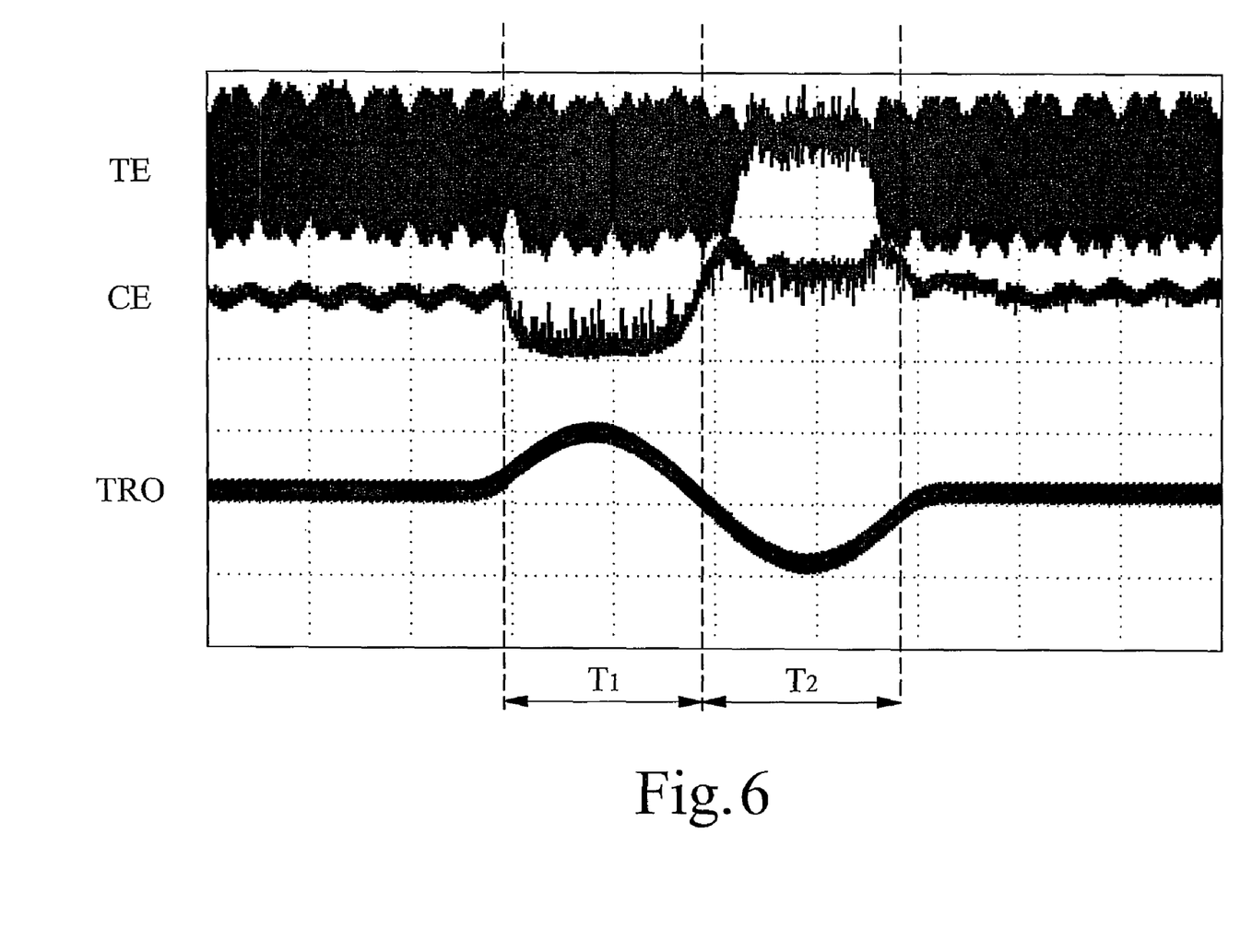
FIG. 6 is a schematic diagram of wave forms of signals related to the method of FIG. 5.

Referring to FIG. 6, a schematic diagram of wave forms of signals related to method 500 of FIG. 5 is shown. The signals shown in FIG. 6 include a tracking error (TE) signal, a center error (CE) signal, and a tracking control output (TRO) signal. The seek control device 412 raises the TRO signal to shift the lens 418 with positive shift distances toward the direction $D_1$ during a period T1 and then lowers the TRO signal to shift the lens 418 with negative shift toward the direction $D_2$ distances during a period T2. The CE signal reflects a shift level of the lens 418 from the origin. Therefore, the CE signal shifts down during the period T1 and then shifts up during the period T2. Because the servo signal such as the TE signal has a greater amplitude and a better quality during the period T1 in comparison with that during the period T2, the direction $D_1$ corresponding to shifting the lens 418 with positive shift distances is determined as the track-on direction $S_1$.

Figure 7:
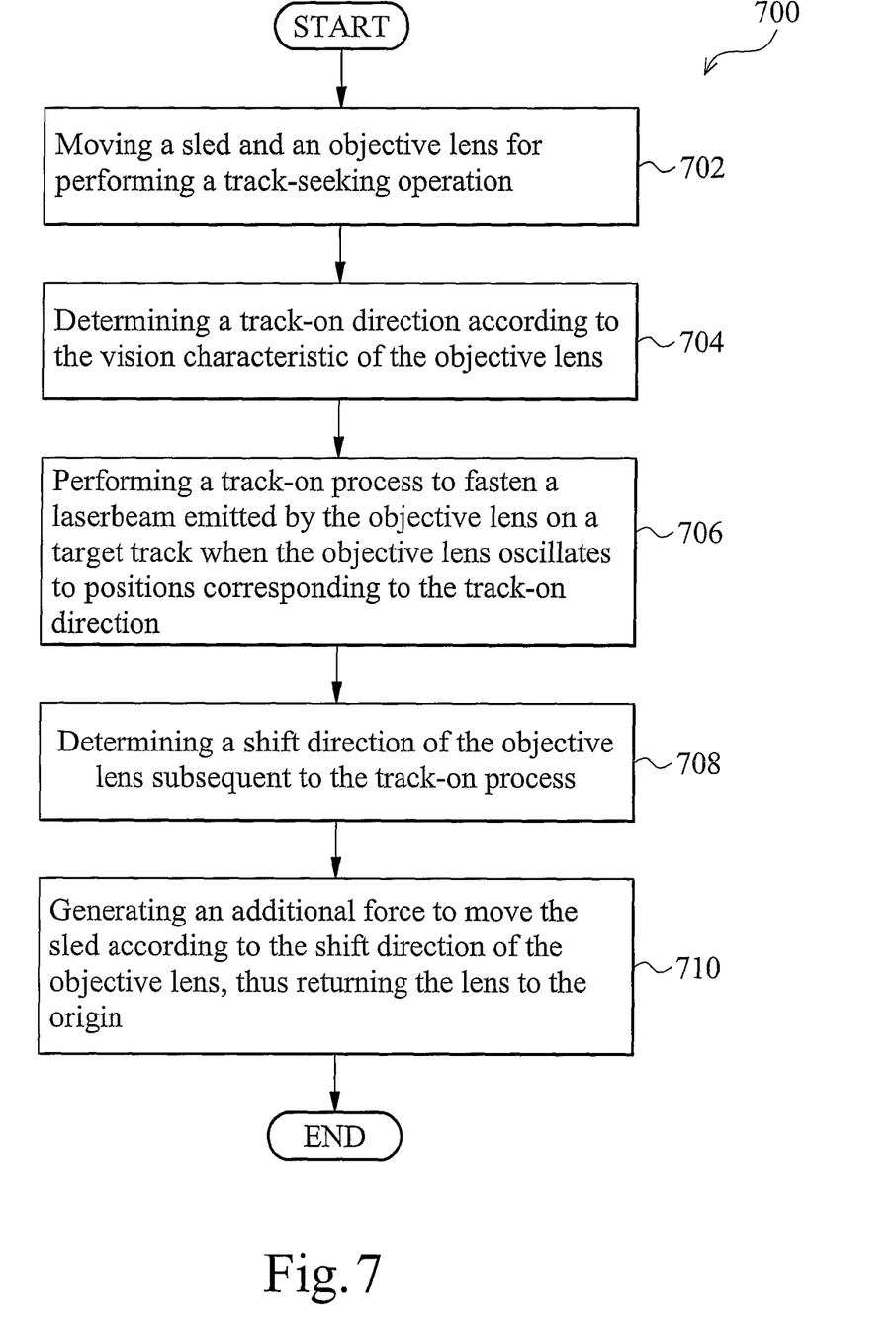
FIG. 7 is a flowchart of a method for controlling track-seeking operation according to the invention.

The anti lens shift device 422 then controls track-seeking operation according to the vision characteristic obtained according to the method 500. Referring to FIG. 7, a flowchart of a method 700 for controlling track-seeking operation according to an embodiment of the invention is shown. The seek control device 412 first moves the sled 416 and the objective lens 418 for performing track-seeking operation (step 702). The lens vision characteristic decoder 424 then determines a track-on direction $S_1$ according to the vision characteristic of the lens 418 (step 704). In one embodiment, the lens vision characteristic decoder 424 determines the track-on direction $S_1$ according to in which direction among direction $D_1$ and the direction $D_2$ the lens 418 is shifted, generating the servo signal with a better characteristic. For example, referring to FIG. 2, because the first values 204~206 corresponding to the direction $D_1$ with positive shift distances is larger than the second values 208~210 corresponding to the direction $D_2$ with negative shift distances; that is the servo signal generated when the lens 418 is shifted at a positive shift distance has a better quality. Thus, according to the vision characteristic of the lens 418, the direction $D_1$ is determined to be the track-on direction $S_1$.

After the track-on direction $S_1$ is determined, the anti lens shift device 422 triggers the seek control device 412 to perform a track-on process to fasten a laserbeam emitted by the lens 418 on a target track according to the track-on direction (step 706). As shown in FIG. 3, when a laserbeam projected by the lens 418 is locked on a track of the disk 420, the lens 418 oscillates back and fourth between the positions 330 and 340 with oscillation of the disk 420. The position of the lens 418 is relative to the sled 416 and therefore changes due to the oscillation. Referring to FIG. 2, the lens positions corresponding to the direction $D_1$ has a better vision characteristic, such as the values 204, 214, . . . , 206. In contrast, the lens positions deviating from the direction $D_1$ has a poor vision characteristic, such as the values 208~210. The anti lens shift device 422 therefore sends a signal $S_2$ to trigger the seek control device 412 to perform a track-on process when the lens 418 oscillates to a position corresponding to the track-on direction $S_1$ (step 706). When the spot on the laserbeam emitted by the lens 418 is locked on the positions corresponding to the track-on direction, the servo signal generated by the lens 418 has higher amplitude, thus improving performance of the optical disk drive 400.

After the track-on process is performed, the lens 418 may not return to an origin 202 relative to the sled 416. In other words, the lens 418 may not locate at a middle point of the sled 416. The anti lens shift device 422 then determines a shift direction of the lens 418 (step 708). In other words, the anti lens shift device 422 determines in which direction the lens 418 deviates from the origin 202 with respect to the sled 416. For example, the shift direction of the lens 418 can be determined according to a tracking error (TE) signal, a center error (CE) signal, or a tracking control output (TRO) signal. The anti lens shift device 422 then generates an additional force to move the sled 416 according to the shift direction of the objective lens 418 to return the lens 418 to the position at the origin 202 (step 708). In one embodiment, generation of the additional force comprises increasing an equalizer bandwidth of the sled 416, directly feeding the CE signal back to the sled 416 for compensation, or applying an open kick force to quickly move the sled 416. Thus, the lens 418 is prevented from being located at positions far from the origin 202 with respect to the sled 416 subsequent to track-on process, and the lens 418 may not oscillate to an extreme point to deteriorate the signal amplitude.

Figure 8:
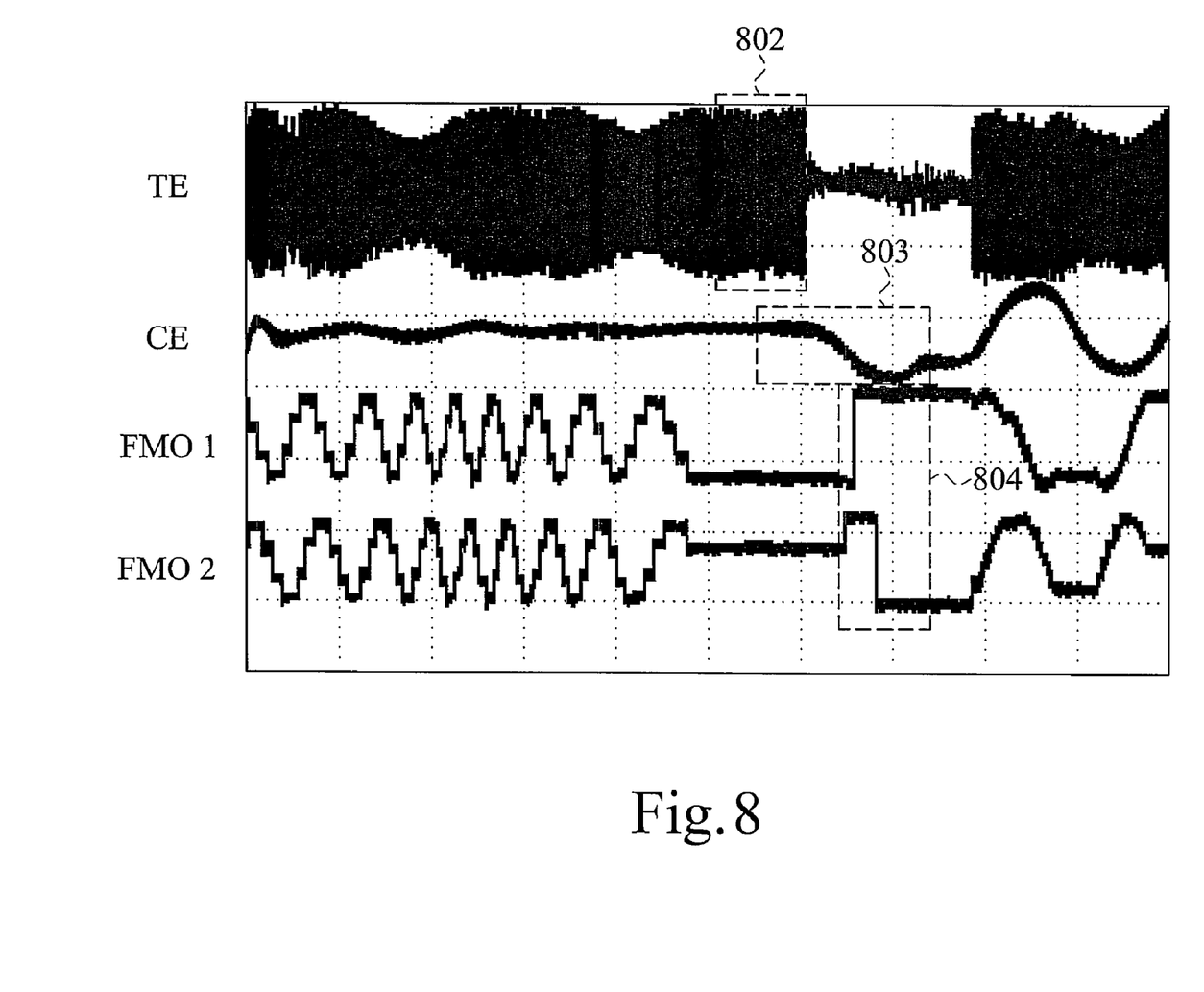
FIG. 8 is a schematic diagram of wave forms of signals related to the method of FIG. 7.

Referring to FIG. 8, a schematic diagram of wave forms of signals related to method 700 of FIG. 7 is shown. The signals shown in FIG. 8 include a tracking error (TE) signal, a center error (CE) signal, and two feed motor output signals FMO1 and FMO2. The seek control device 412 first performs track-seeking operation. After a track-on process is performed, the amplitude of the TE signal dramatically decreases, as shown in the region 802. The anti-lens shift device 422 then detects a shift direction of the lens 418 according to the CE signal, as shown in the region 803. The anti lens shift device 422 then triggers the seek control device 412 to adjust the position of the sled 416 to return the lens to an origin corresponding to the middle point of the sled 416. The seek control device 412 then generates the signals FMO1 and FMO2 to move the sled 416 as shown in the region 804, thus returning the lens 418 to an origin.

It is noted that the steps 704~706 and the steps 708~710 are not necessarily performed together. In one embodiment, only the steps 702~706 are performed to lock the lens 418 on a position with a better vision characteristic. In another embodiment, only the steps 702, 708 and 710 are performed to kick the lens 418 back to a position corresponding to the origin 202. For example, when a lens have a good vision characteristic in both directions $D_1$ and $D_2$, or the amplitudes of signals do not severely decrease in both directions $D_1$ and $D_2$, the steps 704 and 706 may be be omitted.

In addition, the anti lens shift device 422 can move the sled to return the lens 416 to positions other than the origin 202 at step 710. For example, the anti lens shift device 422 can move the sled 418 to return the lens 416 to a position corresponding to the point 212 in FIG. 2. Thus, when the lens 418 moves towards the direction $D_1$ corresponding to the track-on direction, the lens 418 has a large moving range with a good vision characteristic. In another example, the anti lens shift device 422 moves the sled 418 to return the lens 416 to a position corresponding to the point 214 in FIG. 2. Thus, when the lens 418 oscillates, the lens 418 also has a large moving range 216 with a good vision characteristic.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disk drive, comprising:
   a seek control device, controlling a pickup head having a sled and a lens for projecting a beam on a disk, moving the sled, and shifting the lens with a shift distance relative to an origin at a center of the sled;
   an equalizer, deriving a servo signal from a reflection of the beam;
   a lens vision characteristic decoder, obtaining a vision characteristic of the lens according to the servo signal and generating a track-on direction signal according to the vision characteristic of the lens, the vision characteristic of the lens obtained responsive to receiving the servo signal derived from a first reflection corresponding to a first location on the disk and a second reflection corresponding to a second location on the disk; and
   an anti lens shift device, triggering the seek control device to perform a track-on process according to the track-on direction signal, wherein the anti lens shift device further determines a shift direction of the lens relative to the sled according to the servo signal after the track-on process is performed, and generates a force to move the sled according to the shift direction, allowing the lens to be located at a predetermined position after the track-on process is completed.

2. The optical disk drive as claimed in claim 1, wherein the anti lens shift device triggers the seek control device to perform the track-on process when the lens oscillates to a position coinciding with the track-on direction signal.

3. The optical disk drive as claimed in claim 1, wherein the lens vision characteristic decoder measures a characteristic of the servo signal to obtain a first value corresponding a positive shift distance from the origin, and a second value corresponding to a negative shift distance from the origin, thus obtaining the vision characteristic.

4. The optical disk drive as claimed in claim 3, wherein the lens vision characteristic decoder compares the first value with the second value for determining the track-on direction.

5. The optical disk drive as claimed in claim 1, wherein the servo signal is a tracking error (TE) signal, a radio frequency (RF) signal, a radio frequency ripple (RFRP) signal, a differential push-pull (DPP) signal, a main beam push pull (MPP) TE signal, or a differential phase detection (DPD) TE signal.

6. The optical disk drive as claimed in claim 1, wherein the shift direction is a direction for moving the lens towards the origin.

7. The optical disk drive as claimed in claim 1, wherein the characteristic of the servo signal is an amplitude of the servo signal or a signal-to-noise ratio of the servo signal.

8. An optical disk drive, comprising:
   a seek control device, controlling a pickup head having a sled and a lens for projecting a beam on a disk, moving the sled, and shifting the lens with a shift distance relative to an origin at a center of the sled;
   an equalizer, deriving a servo signal from reflection of the beam; and
   an anti lens shift device, determining a shift direction of the lens relative to the sled according to the servo signal after a track-on process is performed, and generating a force to move the sled according to the shift direction, allowing the lens to be located at a predetermined position after the track-on process is completed.

9. The optical disk drive as claimed in claim 8, wherein the shift direction is a direction for moving the lens towards the predetermined position.

10. The optical disk drive as claimed in claim 8, wherein the predetermined position is the origin.

11. The optical disk drive as claimed in claim 8, wherein the servo signal is a center error (CE) signal, a tracking error (TE) signal, or a tracking control output (TRO) signal.

12. The optical disk drive as claimed in claim 8, wherein the anti lens shift device generates the force to move the sled according to the shift direction by increasing an equalizer bandwidth of the sled, feeding a center error signal back to the sled, or applying an open kick force to the sled.

13. A method for controlling track-seeking for an optical disk drive, wherein a pickup head of the optical disk drive comprises a sled and a lens for projecting a beam on a disk, and a seek control device of the optical disk drive is capable of moving the sled and shifting the lens with a shift distance relative to an origin at a center of the sled, the method comprising:
   deriving a servo signal from reflection of the beam;
   generating a vision characteristic of the lens according to the servo signal, the vision characteristic of the lens generated responsive to receiving the servo signal derived from a first reflection corresponding to a first location on the disk and a second reflection corresponding to a second location on the disk;
   determining a track-on direction according to the vision characteristic of the lens;
   triggering the seek control device to perform a track-on process according to the track-on direction;
   determining a shift direction of the lens relative to the sled according to the servo signal after the track-on process is performed; and
   generating a force to move the sled according to the shift direction, allowing the lens to be located at a predetermined position after the track-on process is completed.

14. The method as claimed in claim 13, wherein the track-on process is triggered when the lens oscillates to a position coinciding with the track-on direction.

15. The method as claimed in claim 13, wherein generating the vision characteristic of the lens comprises:
   measuring a characteristic of the servo signal to obtain a first value corresponding to a positive shift distance from the origin; and measuring the characteristic of the servo signal to obtain a second value corresponding to a negative shift distance from the origin.

16. The method as claimed in claim 15 wherein determining the track-on direction according to the vision characteristic of the lens comprises:
comparing the first values with the second values to determine the track-on direction.

17. The method as claimed in claim 13, wherein the servo signal is a tracking error (TE) signal, a radio frequency (RF) signal, a radio frequency ripple (RFRP) signal, a differential push-pull (DPP) signal, a main beam push pull (MPP) TE signal, or a differential phase detection (DPD) TE signal.

18. The method as claimed in claim 13, wherein the characteristic of the servo signal is an amplitude of the servo signal or a signal-to-noise ratio of the servo signal.

19. The method as claimed in claim 13, wherein the method further comprises:
determining a shift direction of the lens relative to the sled according to the servo signal after the track-on process is performed, and
generating a force to move the sled according to the shift direction, allowing the lens to be located at a predetermined position after the track-on process is completed.

20. A method for controlling track-seeking for an optical disk drive, wherein a pickup head of the optical disk drive comprises a sled and a lens for projecting a beam on a disk, and a seek control device of the optical disk drive is capable of moving the sled and shifting the lens with a shift distance relative to an origin at a center of the sled, the method comprising:
deriving a servo signal from reflection of the beam;
determining a shift direction of the lens relative to the sled according to the servo signal after a track-on process is performed; and
generating a force to move the sled according to the shift direction, thus allowing the lens to be located at a predetermined position after the track-on process is completed.

21. The optical disk drive as claimed in claim 20, wherein the shift direction is a direction for moving the lens towards the predetermined position.

22. The method as claimed in claim 20, wherein the predetermined position is the origin.

23. The method as claimed in claim 20, wherein the servo signal is a center error (CE) signal, a tracking error (TE) signal, or a tracking control output (TRO) signal.

24. The method as claimed in claim 20, wherein generation of the force for moving the sled according to the shift direction comprises increasing an equalizer bandwidth of the sled, feeding a center error signal back to the sled, or applying an open kick force to the sled.

* * * * *